United States Patent [19]

Zielke

[11] 4,167,657
[45] Sep. 11, 1979

[54] KEYBOARD WITH MECHANICAL ENCODING

[75] Inventor: Alfred Zielke, Peine-Vöhrum, Fed. Rep. of Germany

[73] Assignee: ELMEG-Elektro-Mechanik Gesellschaft mit beschrankter Haftung, Peine, Fed. Rep. of Germany

[21] Appl. No.: 883,151

[22] Filed: Mar. 3, 1978

[30] Foreign Application Priority Data

Mar. 3, 1977 [DE] Fed. Rep. of Germany ....... 2709227

[51] Int. Cl.² ............................................... H01H 9/26
[52] U.S. Cl. ................................. 200/5 EA; 200/50 C
[58] Field of Search ................. 200/5 E, 5 EA, 5 EB, 200/50 C; 74/483 PB; 179/189 D

[56] References Cited

U.S. PATENT DOCUMENTS

| 679,310 | 7/1901 | Hall | 200/5 EA X |
|---|---|---|---|
| 2,482,998 | 9/1949 | Andersson | 200/5 EA |
| 3,470,332 | 9/1969 | Milner et al. | 200/5 EA |
| 3,551,611 | 12/1970 | Fechner | 200/5 EA |
| 3,845,255 | 10/1974 | Zielke | 200/5 EA |
| 3,903,381 | 9/1975 | Diehr | 200/5 EA X |
| 4,140,883 | 2/1979 | Zielke | 200/5 EA X |

*Primary Examiner*—James R. Scott
*Attorney, Agent, or Firm*—Ralf H. Siegemund

[57] ABSTRACT

A keyboard has column channels and row channels filled with displacement balls and having trough-like, semicircular cross-sections; this bottom contour of the channels is continued right into the intersection so that balls when displaced by key depressing will be retained in the respective channel, and not be deflected into any intersecting channel, so that the each key is positively identifiable by two switch closings, the switches being disposed for actuation at one end each of these channels.

3 Claims, 4 Drawing Figures

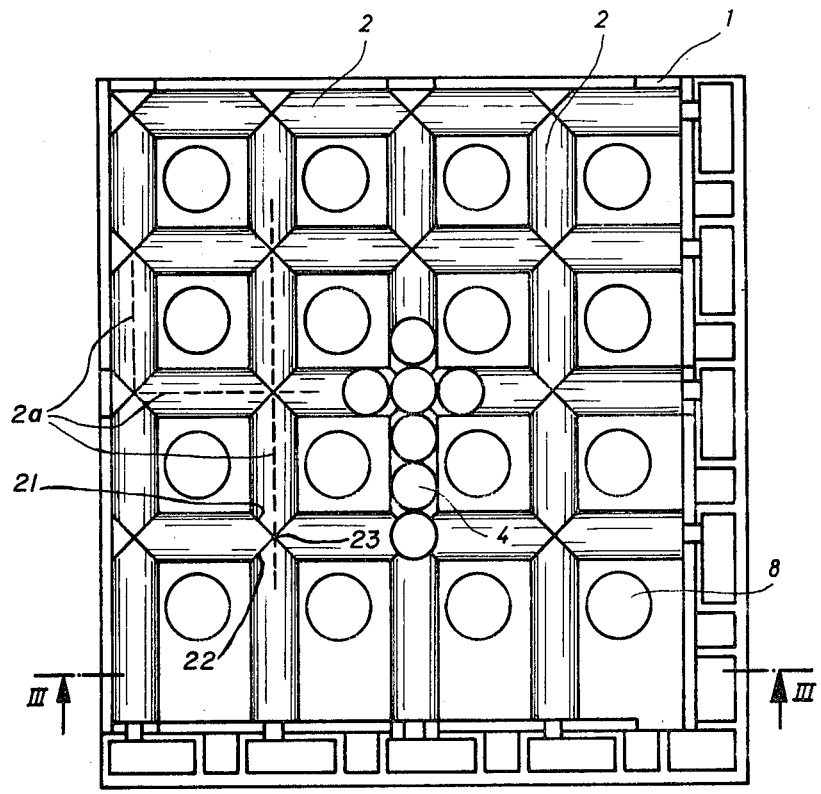
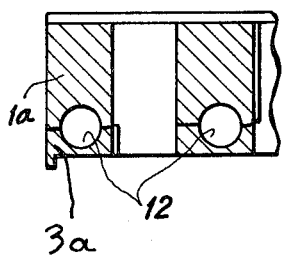
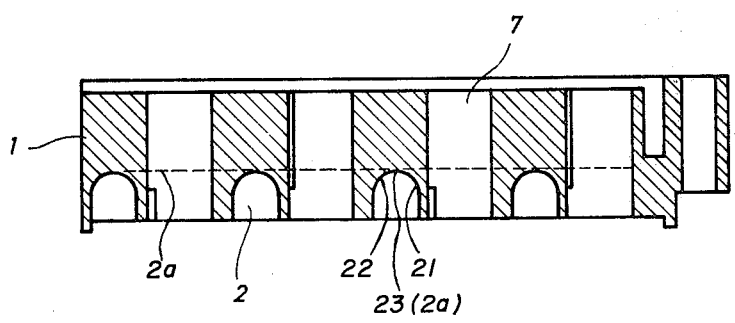

KEYBOARD WITH MECHANICAL ENCODING

BACKGROUND OF THE INVENTION

The present invention relates to a keyboard constructed for mechanically encoding the pressing of a key.

Keyboards of the type to which the invention pertains are, for example, constructed to have a plurality of intersecting ducts, channels or guideways holding displacement bodies. The keys are provided with extensions which will be inserted into the two intersecting channels when the respective key is pressed. Thereupon the displacement bodies of one row and of one column of the channel system are displaced and respectively atuate one switch each. This switch actuation constitutes the encoding.

Keyboards of the type referred to above are, for example, disclosed in U.S. Pat. No. 3,845,255. Such a keyboard is particularly comprised of channels with rectangular cross-sections and being filled with balls which serve as displacement bodies. The channels are slightly wider than the diameter of the balls so that these balls can move freely. Each key of the keyboard is, for example, provided with two fingers, pins or arms which respectively lodge in the two channels at an intersection for displacing the balls therein. The displacement distance in each instance is about equal for the width of the respective finger. Switches at the ends of the channels are actuated by and in response to such a displacement.

It was discovered that the keyboards encoded the key depressing incorrectly in some instances, the switches which were closed were sometimes not those which are supposed to be closed. It was discovered that these incorrect switching operations resulted from the following. The various balls are normally retained in the several channels with some slack. As soon as a key is depressed balls are shifted in two channels adjacent to their intersection. Particular balls in these two channels are additionally shifted in and past other intersections. It was found that in some cases these balls are deflected in such an intersection and rather than continuing the longitudinal displacement in the same channel, a ball escapes laterally into an intersecting channel and causes propagation of the displacement into that channel, resulting in an entirely different switch closing. It was found that such erroneous switching will be the more likely the closer the displacement length is to the ball diameter.

DESCRIPTION OF THE INVENTION

It is an object of the present invention to eliminate the problem outlined above and to provide a new and improved keyboard structure using displacement bodies in which such bodies are displaced with certainty in the desired manner.

It is a particular object of the present invention to improve keyboard structures which are provided with intersecting row channels and column channels and switching means adjacent one end of each of the channels, to be actuated by the displacement of displacement bodies in the channels, whereby such displacement is initiated upon pressing of a key of the board.

In accordance with the preferred embodiment of the invention, it is suggested to contour the channels, at least at, near and in the intersections, and at least as far as the bottom of a channel is concerned, to have concavely shaped at at least partially matching contours with the displacement bodies so that the bodies are fully guided right up to as well as right from the center of any channel intersection. The bodies are preferably balls, and the channels have at least semicircular cross-section, possibly even tubular cross-section. One can say that the bottom contour of the channels is established by parallel lines which, in transverse cross-section, outline a curve which extends parallel to a curve-of-contact on the displacement bodies with the channels.

It was found that the displacement bodies are readily prevented from laterally escaping into an intersecting duct due to the continuation of guiding right in the intersection. In the case of square-shaped ducts, no guidance exists for a ball for the entire width of the respective intersecting duct.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 2 is a section view through the keyboard of FIG. 1, in a plane parallel to and underneath the plane of view of FIG. 1, the figure can also be interpreted as a view into the keyboard structure with cover plate and keys removed;

FIG. 3 is a view along lines III—III in FIG. 2; and

FIG. 3a is a similar section view but showing a modification.

DESCRIPTION OF THE PREFERRED EMBODIMENT

Figure 1:
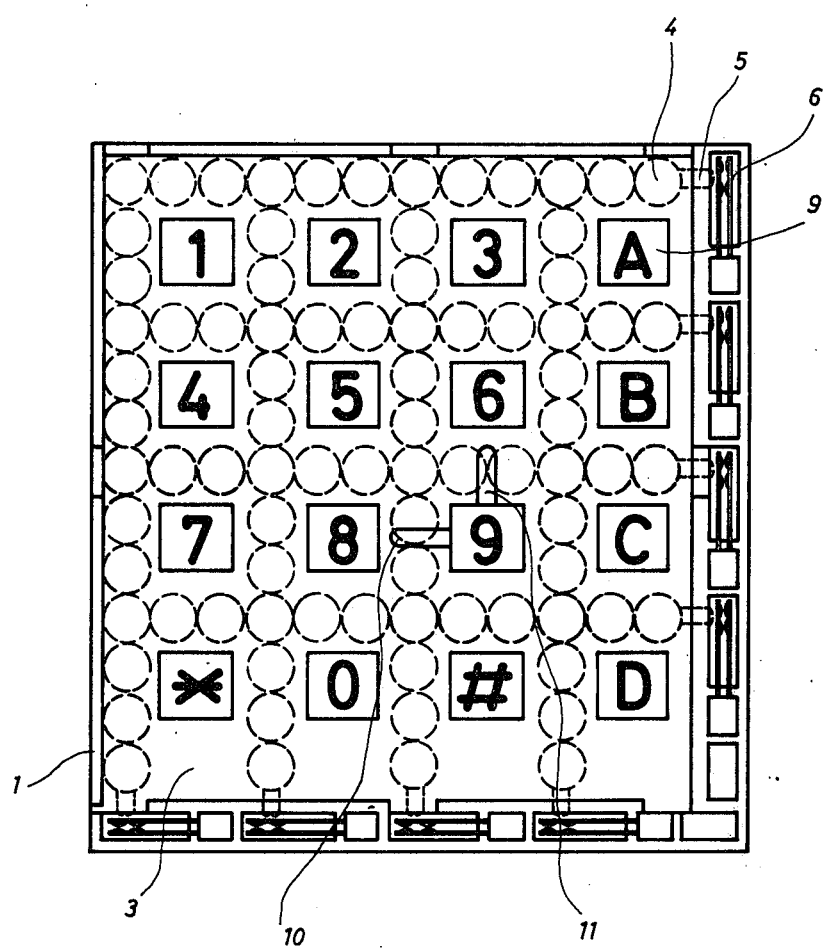
FIG. 1 is a front view of a keyboard showing in phantom lines balls as displacement bodies.

Proceeding now to the detailed description of the drawings, the figures show a casing 1 of flat configuration and having a set or system of grooves or channels 2. These channels are arranged in two groups of parallel channels for each group, and the channels of the two groups are arranged in an array and intersect at right angles. One can also say that rows of channels intersect columns of channels. The channels are open at the top as to the body 1 but are covered by a top or cover plate 3 being removed in FIGS. 2 and 3.

The channels 2 contain displacement bodies such as balls 4 and are of open construction at one end each. A pin such as 5 projects through the opening for engagement with the balls in the respective channel. The other end of each pin engages contact springs 6. As the balls in the channel are displaced towards the pin 5, the pin closes the contacts (or opens them if such a mode of operation were desired). The springs are sufficiently resilient to push the pin and balls back when the latter are not actively displaced.

The case or body 1 has additionally sixteen bores 7 arranged in a matrix, each being central to four intersections of the columns and rows of the channel system. However, each such bore 7 is in effect associated with but one intersection. The association is derived from the keys 9, each having a plunger 8 which is respectively received in one of the bores 7. Each plunger 8 carries two lateral pins, arms, fingers or tongues 10 and 11 respectively. These tongues extend normally (undisplaced keys) above the plane of the balls. Upon pressing the key, the respective tongue 10 is forced into a column channel, and the tongue 11 is forced into a row channel. The intersection of these two channels is thereby associated with the respective key. The tongues when thus moved into the channels displace the balls therein which in turn actuate the respective pins and switches at the end of each channels.

As can be seen particularly from FIGS. 2 and 3, the grooves or channels 2 are trough-shaped, i.e. their bottom has concave, semi-circular-cylindrical configuration (semi-circular cross-sections) matching closely the diameter of the balls. One could also say that each channel has a line-shaped bottom proper from which sidewalls curve upwardly. The semi-cylindrical channel bottoms and sidewalls merge at the intersection, but each channel maintains its contour up to the center of the intersection. The bottom proper or bottom line of the channels is shown in places by a dashed line 2a in FIG. 2. These bottom lines extend in the same plane, and the curved bottom and sidewalls form sidewalls of declining height into the intersection. The cross-section of each channel bottom is not a full semi-circle in the intersection but is arc-shaped with declining arc length right up to the center of each intersection. The bottom lines 2a intersect in the common apex 23 of each pair of crossing arcs 21, 22 in the intersection. These arches are formed by the intersecting sidewalls and establish the declining wall height thereof towards the midpoint 23. As a consequence any ball moving in a channel is retained by its side walls up to the center of the intersection. There is, therefore, no loose play nor lack of a definite ball position in an intersecting area. Any ball entering and passing through an intersection is laterally retained in its channel up until the center of the intersection, and beyond the center point guidance is immediately taken over by the continuation channel. There really is no opportunity for a ball to escape laterally into the respective transverse channel.

The example of FIG. 3 shows particularly a semi-cylindrical bottom of each channel. FIG. 3a shows that the opposite on top of the channel can be likewise semi-cylindrical so that each channel is in fact of tubular configuration 12. For ease of manufacturing, one will provide top and bottom portions 1a, 3a, seperately with semi-cylindrical grooves. The configuration as per FIG. 3a is clearly better from the point of view of ball guiding, but it is also clearly a more expensive version. The profile as per FIG. 3 does suffice particularly if the tolerances are rather close. In both versions however, the bottom of each channel is of partial circular cylindrical contour, amounting to semi-circular-cylindrical contour if one extends the bottom of each channel all the way to the widest part of a channel.

It should be noted further that in principle the semi-circular or even circular channel cross-section and contour has to be provided for and near, and in the intersections in order to accomplish the purpose and objective outlined above. Thus, the contour rules need not be applied to the entire channel in each instance but only to portions thereof. However, it is simpler to provide for uniform channel contour throughout.

The invention is particularly adapted for use in telephone and other communication facilities. The invention is not limited to the embodiments described above but all changes and modifications thereof not constituting departures from the spirit and scope of the invention are intended to be included.

I claim:

1. In a keyboard having indivudally depressible keys arranged in an array further having a plurality of row channels and a plurality of column channels intersecting the row channels to establish an array of intersections, displacement bodies in the channels and provided for limited displacement therein, further having switching means adjacent one end each of at least some of the channels to be actuated upon displacement of the bodies in the respective channels, the keys each being provided with means for displacing the bodies in one row channel and in one column channel upon being depressed, the improvement comprising;

the channels each having bottom and sidewall portions of partial cylindrical contour concavely matching the contour of the bodies at least over a portion of the body in any plane through any of the bodies and extending transversely to the respective channel the body is in, said bottom and sidewall portion of each channel extending at least into and through any of the intersections of the channel resulting in the formation of sidewalls of declining height, whereby a pair of crossing arcs is defined in each intersection having an apex wherein the respective lowest bottom lines of the two intersecting channels intersect.

2. In a keyboard as in claim 1, the bodies being balls, the channels having semi-circular cross-sections.

3. In a keyboard as in claim 1, the bodies being balls, the channels having circular cross-sections.

* * * * *